Nov. 27, 1945.  A. L. GRISÉ  2,389,621
FLUID PRESSURE MOTOR
Filed Sept. 16, 1944    3 Sheets-Sheet 1
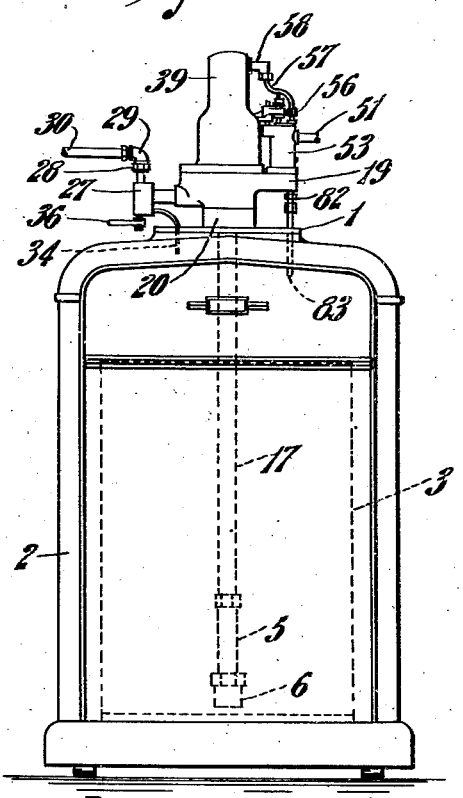
INVENTOR,
Alfred L. Grisé,
BY Chapin + Neal
ATTORNEYS

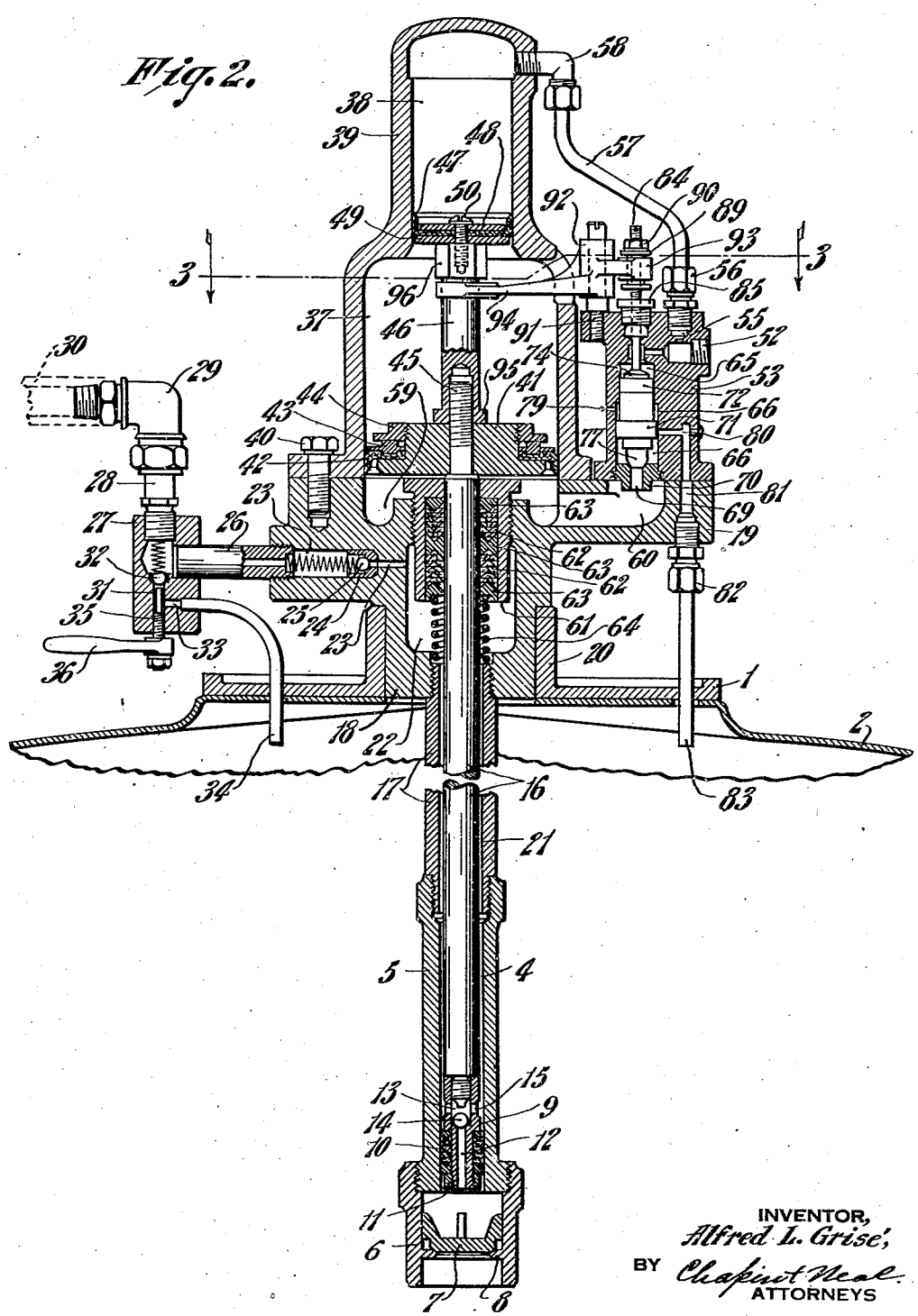

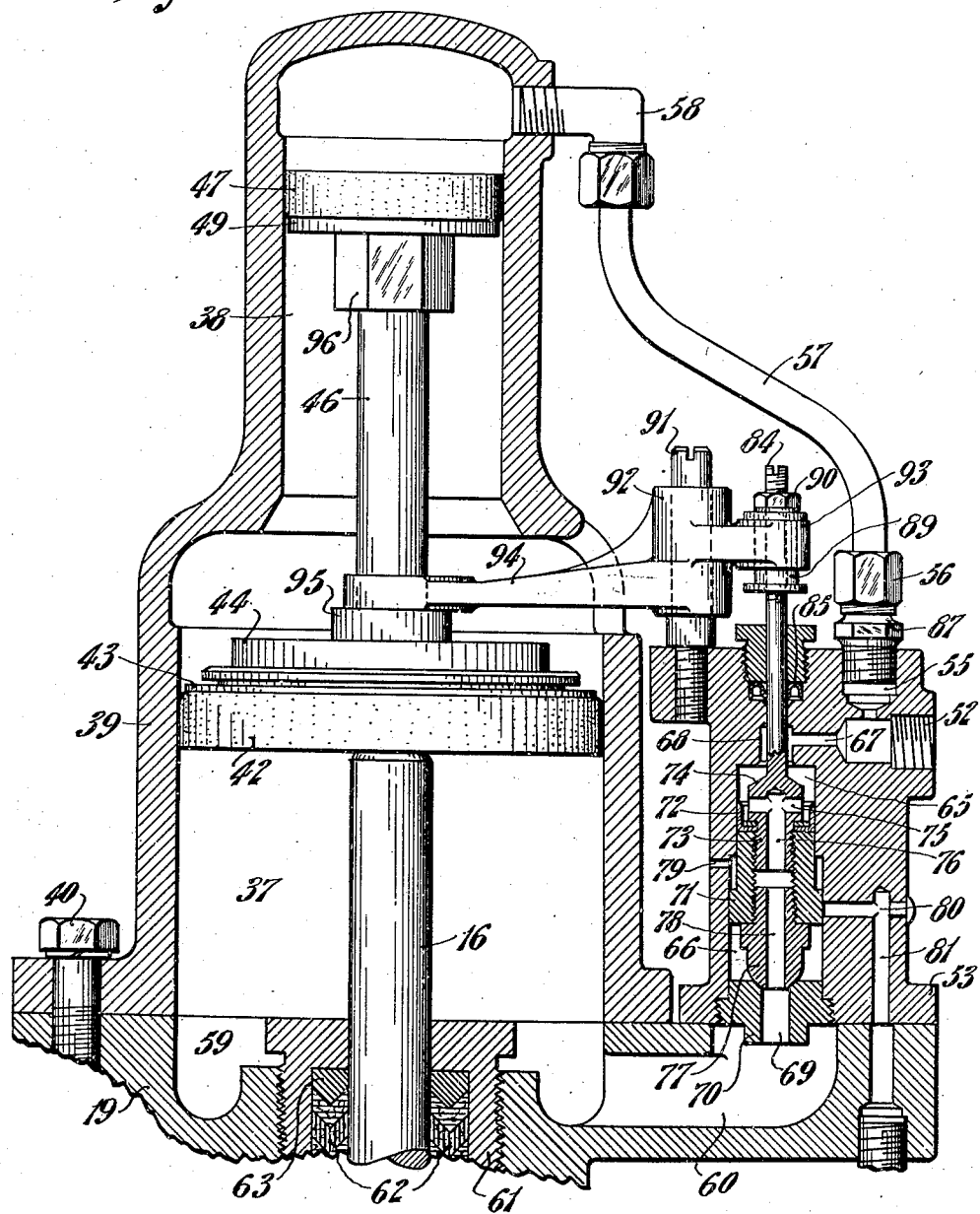

Patented Nov. 27, 1945

2,389,621

UNITED STATES PATENT OFFICE 2,389,621

FLUID PRESSURE MOTOR

Alfred L. Grisé, Springfield, Mass., assignor to Gilbert & Barker Manufacturing Company, West Springfield, Mass., a corporation of Massachusetts Application September 16, 1944, Serial No. 554,406

8 Claims. (Cl. 121—152)

This invention relates to improvements in motors of the reciprocating-piston type, adapted to be operated by fluid under pressure.

The invention, while capable of other applications, is especially adapted for use as a driving means for grease pumps, such for example as are used for delivering lubricant under high pressure into the lubricant fittings, and parts to be lubricated, of an automobile. For such service, it is often necessary to deliver a plurality of charges of lubricant in succession to a lubricant fitting, thus requiring a plurality of cycles of operation of the grease pump. Hence, it is desired to have the motor automatically continue in action for as many strokes of the grease pump as may be required, an automatically reversing valve means being provided in the motor for the purpose.

A simple reversing valve means for the purpose, and one which is operated solely by pressure of the fluid fed to the motor, is shown in the Wilson and Eagley Patent No. 2,029,145, dated January 28, 1936. This valve means requires the use of a control valve for the compressed air used to operate the valve means and motor. The operator has to hold this air valve open as well as to control the grease valve in the dispensing nozzle of the service hose. This is difficult and inconvenient. If one omits the air valve of said patent, the motor can be stopped by closing the valve in the grease nozzle. Since the grease being dispensed is substantially incompressible, stoppage of the flow of grease will stall the piston of the motor. However, the reversing valve means of said patent will continue in operation after the piston is stalled. If the piston stalls anywhere between the two extreme ends of its stroke, pressure will build up in the motor cylinder and cause a reversal of the valve means and the exhausting of air from the cylinder. When the motor cylinder is exhausted, the valve will reverse again and admit compressed air to the motor cylinder. When the cylinder is filled, as much as possible, pressure again builds up to again cause the valve to reverse and exhaust the cylinder. The described action will continue indefinitely or until the air supply is shut off or fails. The action described is, of course, wasteful of compressed air.

This invention has for an object the provision of an improved reversing valve of the general type disclosed in said patent but arranged so that the motor may be started and stopped under the control of the valve in the grease dispensing nozzle without requiring any manual control of the compressed air, or other pressure fluid, used to operate the motor and without continuous actuation of the valve means and the consequent wasting of compressed air.

More particularly, the invention has for an object the provision of means, operable by the power piston only at the end of its power stroke, to initiate the reversal of the valve means, the reversal once started being completed by fluid pressure as in said patent.

The invention has for another object the provision of supplementary means, operable by the power piston at the end of its return stroke, to initiate movement of the valve means for the purpose of admitting pressure fluid to the power piston to move the latter on its power stroke, this supplementary means functioning only when the normal means of fluid pressure fails due to sticking of the valve or its pistons.

The invention has for another object to provide the reversing valve means and the valve-initiating-means, above described, as a unit secured to the base of the motor independently of the power cylinder and being removable as a unit by simply withdrawing it laterally of the power cylinder after it has been unfastened from the base.

The invention has for another object the provision of a reciprocating-piston, fluid-pressure-operated motor having generally improved mechanical structure.

The invention will be disclosed with reference to the accompanying drawings, in which, Fig. 1 is a small scale exterior elevational view showing the motor adapted to operate a grease pump, mounted on a cabinet, to dispense grease from a drum contained in the cabinet;

Fig. 2 is a sectional elevational view of the motor and grease pump which it operates;

Fig. 3 is a sectional plan view taken on the line 3—3 of Fig. 2;

Fig. 4 is a view taken similarly to Fig. 2 but drawn to a larger scale and showing in more detail the motor and its valve mechanism; and Fig. 5 is an enlarged fragmentary sectional view of a detail shown in Figs. 2 and 4.

Referring to these drawings, the grease pump and its actuating motor are supported from a base plate 1 (Figs. 1 and 2) which, in this particular case, is mounted on top of a wheeled cabinet 2 (Fig. 1), adapted to contain a grease drum 3, having its cover removed. The arrangement is such that the grease pump is located in drum 3, near the base thereof and submerged in the grease, while the motor is exposed outside the cabinet.

The grease pump (Fig. 2) consists of a cylinder 4 within a barrel 5, having threaded on its lower end a casing 6, containing a foot valve 7, cooperating with a seat 8 formed in the casing. The lower end of casing 6 is open to the grease drum and the upper end is in communication with the lower end of cylinder 4. Slidable in cylinder 4 is a piston, comprising, a body 9, packing 10 and a nut 11 for clamping the packing to the body. The piston body has an axial passage 12 leading upwardly from its lower end to a valve chamber 13, containing a ball valve 14, adapted to seat on and close the upper end of passage 12. Radial outlets 15 are provided in the body 9 to connect the chamber 13 with the cylinder 4 at a location above the piston packing 10. Secured to the top of the piston is a piston rod 16 which extends upwardly through a conduit 17. The lower end of conduit 17 is threaded into the barrel 5 and the upper end thereof is threaded into the lower end of a hub 18 on a base 19. The hub 18 is mounted in the central axial passage of a hub 20 on the base plate 1 with a shoulder on the base 19 resting on the top face of hub 20. The grease pump is thus supported from the base plate 1 and within the drum 3.

The diameter of the piston rod 16 is less than the internal diameter of conduit 17, leaving an annular outlet passage 21 for the grease. This passage, at its upper end, opens into the base of a cylindrical chamber 22 in hub 18. From chamber 22, a radial outlet 23 is provided in base 19 having, intermediate its ends, a seat-forming cup 24 for a spring-pressed ball-check valve 25. A nipple 26 connects the outer end of passage 23 to a casing 27. To the upper end of casing 27 is connected the lower element 28 of a swivel joint, the other element 29 being connected to the inner end of a dispensing hose 30. The outer end of this hose customarily carries the usual valve-controlled grease-dispensing nozzle (not shown).

The casing 27 has a second outlet passage 31 normally closed by a spring-pressed ball valve 32. Passage 27 is connected by a radial passage 33 to a tube 34 which extends through baseplate 1 and the top wall of cabinet 2 inside the latter in overlying relation with the open upper end of grease drum 3. A stem 35, threaded into the lower end of casing 27, may be rotated by handle 36 to force valve 32 off its seat and vent the outlet passage and hose 30. The grease expelled during the venting operation falls into drum 3.

When the piston 9 is lifted, valve 7 opens and valve 14 closes, whereby a partial vacuum is created in the lower end of cylinder 4 and valve casing 6 to draw grease therein from drum 3. On the down stroke of the piston, valve 7 closes and valve 14 opens, whereby grease passes through the piston, to be raised on a succeeding upstroke thereof. The grease eventually fills the conduit 21 and chamber 22 and is expelled through check valve 25 into the dispensing hose.

The actuating motor for the grease pump is of the reciprocating-piston type, actuated by fluid under pressure, such for example as compressed air. The motor includes a lower large power cylinder 37 and an upper small power cylinder 38, both being formed in coaxial relation in a body 39, secured as by cap screws 40, to the upper face of the described base 19. In the lower cylinder 37 is a power piston comprising a body 41, cupped piston leather 42, backing plate 43 and clamping nut 44. The nut 44, threaded on the upper and smaller part of the piston body forces plate 43 against the piston leather and clamps it to the body. The upper end of piston rod 16 is turned down and threaded as at 45, passing through piston body 41 and threading into the lower end of a connector rod 46, whereby the lower power piston is fixed to the piston rod 16 of the grease pump. This rod 46 is cylindrical, except for its upper end which is made hexagonal to receive a wrench. The upper piston consists of a cupped piston leather 47, held between upper and lower circular disks 48 and 49, respectively, by a screw 50, which is threaded into the upper end of rod 46.

Pressure fluid, such for example as compressed air, is supplied to the upper end of cylinder 38 from a supply pipe 51 to a main inlet passage 52, formed in a valve casing 53, secured as by the screws 54 (Fig. 3) to base 19. Passage 52 is in constant communication with a vertical passage 55 in casing 53. Passage 55 is connected by a compression coupling 56, a metal tube 57 and compression coupling 58 to the upper end of cylinder 38. The upper end of this cylinder is thus subjected constantly to air pressure except when the shut-off valve (not shown) in supply pipe 51 is closed.

The base 19 forms the head for the lower end of power cylinder 37 and has a chamber 59 therein, which is connected by a lateral conduit 60 in the base to the lower end of valve casing 53. The piston rod 16 enters the chamber 59 through a stuffing box, comprising a hollow casing 61, which is of inverted cup form and is threaded into the bottom wall of the chamber 59 and extends into grease chamber 22. Within this casing are packing rings 62, approximately V-shaped in cross section, and spreader rings 63. The upper series of rings 62 are turned oppositely from the lower series. A spring 64 acting against the upper end of conduit 17 presses the lower spreader ring 63 upwardly, compressing the lower column of packing rings 62 against the intermediate spreader ring 63, and the latter compressing the upper series of packing rings against the upper and stationary spreader ring 63. The packings 62 are thus expanded against the piston rod 16 and against the peripheral wall of casing 61 to prevent the escape of grease into air chamber 59 or air into grease chamber 22. It will be noted that air leaking from chamber 59 along rod 16 will tend to expand the upper packing rings and that grease, leaking from chamber 22 along rod 16 will tend to expand the lower set of packing rings. A very effective seal is thus provided to prevent loss of air and loss of grease.

Referring now to Fig. 4, the air valve casing 53 is provided with upper and lower valve cylinders 65 and 66 of different areas. The upper and smaller cylinder 65 can communicate with air supply passage 52 by way of horizontal and vertical passages 67 and 68, respectively, the latter opening into the upper end of the cylinder 65. The lower and larger cylinder 66 can communicate with passage 60, and thus with the lower end of the power cylinder 37, by way of a passage 69 formed in a bushing 70, screwed into the lower end of valve casing 53. Slidable in the lower cylinder 66 is a valve piston 71, having an upper cylindrical extension entering the upper cylinder 65 and to the upper end of which a piston leather 72 is clamped by a member 73, threaded into said extension. The upper end of member 73 has a valve 74 to control communication between the passage 68 and cylinder 65. Member 73 has a diametrical passage 75 therethrough below valve 74 and above valve piston 72, and an axial passage 76 leading from passage 75 downwardly through the member. Fixed to the valve piston 71 is a valve 77 to control communication between the lower end of valve cylinder 66 and conduit 69. An axial passage 78 extends through this valve 77 and communicates with passage 76. The upper end of valve cylinder 66 is permanently vented to the atmosphere by a radial passage 79 in casing 53. Below this vent, is larger passage 80 which is closed by piston 71 when valve 77 is seated. This exhaust passage 80 communicates with a passage 81 in casing 53. Passage 81 is connected by a compression coupling 82 to a tube 83 which extends downwardly through base plate 1 and the top wall of cabinet 2 into the latter.

The valve 74 has a stem 84, which extends upwardly through passage 68 and through the upper end of the casing 53. A packing ring 85 (Fig. 5), of V-shaped cross section and with its ends skived, is located in a chamber 86 in casing 53 and encompasses stem 84. This chamber 86 is closed by a threaded plug 87 which holds the packing ring in place but which cannot compress it, or move it downwardly, beyond the position shown. The lower wall of chamber 86 is countersunk, as at 88, to enable any air which passes upwardly along stem 84 to enter the chamber 86 between the two annular parts of the packing ring and force them one against the stem 84 and the other against the peripheral wall of the chamber 86, thereby forming an effective seal for the stem.

Threaded on the upper end of stem 84 (Fig. 4) and therefore adjustable axially on the stem, is a spool 89. The spool is fixed in the desired axial position of adjustment on the stem by a lock nut 90. Fixed in the upper end of casing 53 and paralleling the axis of stem 84, is a stud 91 forming a guide. Slidable axially on this guide stud is a hub 92, from which two forked arms 93 and 94 extend outwardly in opposite directions. The forked end of arm 93 (Fig. 3) straddles the spool 89 and lies between the end flanges thereof (Fig. 4). The forked end of arm 94 (Fig. 3) straddles the connector 46 and lies in the path of the lower flange 95 (Fig. 4) on the connector 46 and in the path of the hexagonal flange 96 on the upper end of the connector.

The operation of the valve mechanism will next be described. With the parts positioned as in Figs. 2 and 4, air under pressure has entered the upper end of the smaller valve cylinder 65 and the differential valve piston 72, 71 is held thereby in its lower and illustrated position with the valve 77 pressed tightly against its seat on bushing 70. As will be clear from Fig. 4, air can then pass through the differential piston, and connected valves, by way of passages 75, 76, and 78 and pass out through passage 69 and lateral passage 60 into the lower end 59 of power cylinder 37. The air pressure acting on power piston 42 will lift the latter from the position shown in Fig. 2, forcing the smaller power piston 47 upwardly in its cylinder 38. As the large power piston 42 nears the upper end of its power stroke (Fig. 4) the flange 95 thereon will engage arm 94, and lift it until its companion arm 93 engages the upper flange of spool 89. A slight additional upward movement of the large power piston will cause the spool 89 and stem 84 to be lifted and the valve 77 raised from its seat. The action of arms 94, 93 is to crack the valve 77 off its seat. As soon as this occurs air under pressure enters the lower cylinder 66 from cylinder 37 and drives the piston 71 upwardly against the lesser pressure acting downwardly on the smaller piston 72. Air in cylinder 66 above the piston 71 vents through hole 79. The piston 71 is instantly driven to its uppermost position, seating valve 74 and stopping inflow of air under pressure to cylinder 65. When piston 71 reaches its upper position, the exhaust passage 80 is fully uncovered and air from cylinder 37 can escape. Thus, the upper power piston 47 will now be driven downwardly forcing down the lower piston 42 and forcing the air out of the cylinder 37 until the lower piston reaches its lower limit. Air will exhaust through passages 80, 81 and tube 83, until the pressure in cylinder 66 is at atmospheric. Then, the air under pressure, acting on valve 74, will start the latter downwardly. If it doesn't, due to sticking of the valve 74 or connected valve pistons or for any other reason, then the flange 96, acting on arm 94, will through arm 93 engage the lower flange of spool 89 and force stem 84 downwardly far enough to open valve 74. The normal way is for valve 74 to open by air pressure, as first described. The arms 94, 93 are provided as a precautionary measure to insure the result if the normal means fail. As soon as valve 74 opens even slightly, air enters the upper end of cylinder 65 and acts on the piston 72 to drive the latter downwardly as far as it will go, that is until valve 77 seats on bushing 70. This causes piston 71 to close off the exhaust passage 80 and also by the closure of valve 77 prevents air under pressure from reaching cylinder 66. The large piston 42 of the air motor is again driven upwardly as described and at the upper end of its stroke the valve 77 is again raised to drive the differential valve piston upwardly, close off the compressed air supply and allow the upper power piston 47 to drive the piston rod 16 downwardly. The action described is repeated indefinitely as long as compressed air supply is turned on and the valve in the grease dispensing nozzle is open. The grease pump piston is thus automatically reciprocated to pump grease from drum 3 and force it out through the dispensing hose.

It will be clear that the valve 77 when closed as it is at the start of the power, or grease-dispensing stroke of piston 42, closes off communication between the lower end of the power cylinder 37 and the lower and larger cylinder of the reversing-valve-means. Hence, this valve means cannot be reversed, as in said patent, merely by the increase in pressure in the power cylinder after the power piston completes its power stroke, or after it is stopped at any point in its power stroke by stoppage of flow of grease from the dispensing conduit. The control of the valve reversal is effected only by the arrival of the power piston at the end of its power stroke. Then, and only then, will valve 77 be opened, the result being effected by making the power piston mechanically lift the stem 84 of the reversing-valve-means. Once the valve 77 is cracked from its seat, pressure fluid rushes into cylinder 66 and rapidly drives the valve means upwardly to cut off the compressed air supply and open the exhaust passage 80. The latter is sufficiently restricted to create sufficient back pressure to enable the valve means to be driven all the way up until valve 74 closes. The exhaust of the power cylinder is substantially silenced by piping it into the top of the grease drum-receiving cabinet 2.

It will thus be clear that the motor may be started and stopped in a very convenient manner by the opening and closing of the valve in the grease dispensing nozzle. The power piston 42 will stop because it stalls on stoppage of outflow of grease from the pump. And, wherever it stops in its power stroke, except at the extreme end of such stroke, the valve 77 will be closed to prevent reversal of the reversing valve means. If the power piston stalls at the end of its power stroke, the valve means will reverse, exhaust the power cylinder 37 and allow piston 42 to be driven to the end of its return stroke, when the valve means will again reverse to admit fluid pressure to the power cylinder 37 but the piston 42 will remain stalled at the start of its power stroke. If the grease valve is closed during the return stroke of the power piston 42, such stroke will be completed but the power piston will then remain stationary at the start of its power stroke. Wherever the power piston 42 stops, it is ready for action and becomes immediately effective to dispense grease on opening of the valve in the grease dispensing nozzle.

I claim:

1. A motor, comprising, a power cylinder and a power piston therein, pressure fluid supply means for delivering fluid to one end of said cylinder to move it on its power stroke, yieldable means for moving the piston on its return stroke when said end of the cylinder is connected to exhaust, reciprocating valve means for controlling an alternate supply of fluid to and exhaust of fluid from said end of said cylinder, means operable by fluid pressure to move said valve means in one direction to admit fluid to said cylinder, means operable by fluid pressure in said cylinder for moving said valve means in an opposite direction to cut off the supply of pressure fluid and open the exhaust, a valve carried by said valve means to shut off communication between the power cylinder and the second fluid-pressure-operated means during the power stroke of the power piston, and means operable by and at the end of the power stroke of said power piston to mechanically lift said valve from its seat and admit fluid pressure from the power cylinder to the second fluid-pressure-operated means and move the valve means to cut off the supply of pressure fluid to and open the exhaust from said power cylinder.

2. A motor, comprising, a power cylinder and a power piston therein, pressure fluid supply means for delivering fluid to one end of said cylinder to move it on its power stroke, yieldable means for moving the piston on its return stroke when said end of the cylinder is connected to exhaust, reciprocating valve means for controlling an alternate supply of fluid to and exhaust of fluid from said end of said cylinder, means operable by fluid pressure to move said valve means in one direction to admit fluid to said cylinder, means operable by fluid pressure in said cylinder for moving said valve means in an opposite direction to cut off the supply of pressure fluid and open the exhaust, a valve carried by said valve means to shut off communication between the power cylinder and the second fluid-pressure-operated means during the power stroke of the power piston, means operable by and at the end of the power stroke of said power piston to mechanically lift said valve from its seat to admit fluid pressure from the power cylinder to the second fluid-pressure-operated means, and means operable by the power piston at the end of its return stroke to mechanically unseat said valve means if the latter fails to open by fluid pressure.

3. A motor, comprising, a power cylinder, a power piston reciprocable therein, a casing having therein interconnected valve cylinders of different areas, interconnected valve pistons reciprocable in the valve cylinders, a supply conduit for fluid under pressure leading to one end of the smaller valve cylinder, a conduit leading from the opposite end of the larger valve cylinder to one end of the power cylinder, a first valve on the smaller valve piston for opening and closing communication between the supply conduit and the smaller valve cylinder, a second valve on the larger valve piston for opening and closing communication between the larger valve cylinder and the second conduit, the first valve being closed when the second valve is open and vice versa, said larger cylinder having an exhaust passage opened and closed by the larger valve piston when the second valve is respectively opened and closed, the second valve and said valve pistons having a passage therethrough opening into the smaller valve cylinder between the smaller valve piston and the first valve, whereby when the first valve is open and the second valve closed pressure fluid can pass from the supply conduit to the power cylinder without entering the larger valve cylinder and move the power piston in one direction, and means operable by the power piston when it nears the end of its stroke in said direction to initiate the movement of the second valve from its seat, thereby enabling pressure fluid from the power cylinder to enter the larger valve cylinder and acting on the larger valve piston to move the valve pistons to close the first valve and open said exhaust passage, and means for moving the power piston in the opposite direction on its return stroke when the exhaust passage is open to exhaust pressure fluid from the said end of the power cylinder, said valve pistons being movable by pressure fluid from the supply conduit to open the first and close the second valve on completion of the exhausting of said end of the power cylinder.

4. A motor, comprising, a power cylinder, a power piston reciprocable therein, a casing having therein interconnected valve cylinders of different areas, interconnected valve pistons reciprocable in the valve cylinders, a supply conduit for fluid under pressure leading to one end of the smaller valve cylinder, a conduit leading from the opposite end of the larger valve cylinder to one end of the power cylinder, a first valve on the smaller valve piston for opening and closing communication between the supply conduit and the smaller valve cylinder, a second valve on the larger valve piston for opening and closing communication between the larger valve cylinder and the second conduit, the first valve being closed when the second valve is open and vice versa, said larger valve cylinder having an exhaust passage opened and closed by the larger valve piston when the second valve is respectively opened and closed, the second valve and said valve pistons having a passage therethrough opening into the smaller valve cylinder between the smaller valve piston and the first valve, whereby when the first valve is open and the second valve closed pressure fluid can pass from the supply conduit to the power cylinder without entering the larger valve cylinder and move the power piston in one direction, means operable by the power piston when it nears the end of its stroke in said direction to initiate the movement of the second valve from its seat, thereby enabling pressure fluid from the power cylinder to enter the larger valve cylinder and acting on the larger valve piston to move the valve pistons to close the first valve and to open said exhaust passage, means for moving the power piston in the opposite direction on its return stroke, when the exhaust passage is open to exhaust pressure fluid from the said end of the power cylinder, said valve pistons being movable by pressure fluid from the supply conduit to open the first and close the second valve on completion of the exhausting of said end of the power cylinder, and means operable by the power piston at the end of its return stroke to open the first valve in the event it does not open automatically by the pressure fluid.

5. A motor, comprising, a power cylinder, a power piston reciprocable therein, a casing having therein interconnected valve cylinders of different areas, interconnected valve pistons reciprocable in the valve cylinders, a supply conduit for fluid under pressure leading to one end of the smaller valve cylinder, a conduit leading from the opposite end of the larger valve cylinder to one end of the power cylinder, a first valve on the smaller valve piston for opening and closing communication between the supply conduit and the smaller valve cylinder, a second valve on the larger valve piston for opening and closing communication between the larger valve cylinder and the second conduit, the first valve being closed when the second valve is open and vice versa, said larger cylinder having an exhaust passage opened and closed by the larger valve piston when the second valve is respectively opened and closed, the second valve and said valve pistons having a passage therethrough opening into the smaller valve cylinder between the smaller valve piston and the first valve, whereby when the first valve is open and the second valve closed pressure fluid can pass from the supply conduit to the power cylinder without entering the larger valve cylinder and move the power piston in one direction, means operable by the power piston when it nears the end of its stroke in said direction to initiate the movement of the second valve from its seat, thereby enabling pressure fluid from the power cylinder to enter the larger valve cylinder and acting on the larger valve piston to move the valve pistons to close the first valve and to open said exhaust passage, a second power cylinder of smaller area than the first power cylinder, a second power piston reciprocable in the second power cylinder and connected to the first power piston, a continuously open connection from said supply conduit to that end of the second power cylinder opposite to the first-named end of the first power cylinder, whereby when the latter is connected to exhaust the second power piston will effect the return stroke of the first power piston, said valve pistons being movable by the pressure fluid to open the first and close the second valve on completion of the exhausting of the second power cylinder.

6. A motor, comprising, a power cylinder, a power piston reciprocable therein, a casing having therein interconnected valve cylinders of different areas, interconnected valve pistons reciprocable in the valve cylinders, a supply conduit for fluid under pressure leading to one end of the smaller valve cylinder, a conduit leading from the opposite end of the larger valve cylinder to one end of the power cylinder, a first valve on the smaller valve piston for opening and closing communication between supply conduit and the smaller valve cylinder, a second valve on the larger valve piston for opening and closing communication between the larger valve cylinder and the second conduit, the first valve being closed when the second valve is open and vice versa, said larger cylinder having an exhaust passage opened and closed by the larger valve piston when the second valve is respectively opened and closed, the second valve and said valve pistons having a passage therethrough opening into the smaller valve cylinder between the smaller valve piston and the first valve, whereby when the first valve is open and the second valve closed pressure fluid can pass from the supply conduit to the power cylinder without entering the larger valve cylinder and move the power piston in one direction, and means operable by the power piston when it nears the end of its stroke in said direction to initiate the movement of the second valve from its seat, thereby enabling pressure fluid from the power cylinder to enter the larger valve cylinder and acting on the larger valve piston to move the valve pistons to close the first valve and open said exhaust passage, a second power cylinder of smaller area than the first power cylinder and connected to the first power piston, a continuously open connection from said supply conduit to that end of the second power cylinder opposite to the first-named end of the first power cylinder, whereby when the latter is connected to exhaust the second power piston will effect the return stroke of the first power piston, said valve pistons being movable by the pressure fluid to open the first and close the second valve on completion of the exhausting of the second power cylinder, and means operable by the first power piston at the end of its return stroke for initiating the opening of the first valve in the event that it fails to open automatically by fluid pressure.

7. A motor, comprising, a base, a power cylinder mounted on said base, a power piston reciprocable in said cylinder, a valve casing having a valve chamber, said casing being mounted on said base and removable independently of the power cylinder, the base having a passage interconnecting the adjacent ends of the power cylinder and valve chamber, valve means reciprocable in said chamber and having a stem extending out of the casing in parallel relation with the axis of the power piston, and a lateral actuating connection for said stem extending from said stem into the path of the power piston; said valve casing, valve, stem and lateral connection being removable laterally as a unit on disconnection of the valve casing from the base.

8. A motor, comprising, a base, a power cylinder mounted on said base, and having a lateral opening therein, a power piston reciprocable in said cylinder, a valve casing having a valve chamber, said casing being mounted on said base and removable therefrom independently of the power cylinder, the base having a passage interconnecting the adjacent ends of the power cylinder and valve chamber, valve means reciprocable in said chamber and having a stem extending out of the casing in parallel relation with the axis of the power piston, a guide on said casing paralleling said stem, a member slidable on said guide and connected to move said stem, said member extending laterally into said opening and cylinder and having an inner forked end straddling said piston rod, and an abutment on the piston rod for engaging and moving said member at a predetermined point in the stroke of the power piston; said valve casing, stem, guide and member being withdrawable as a unit laterally from the cylinder and base on disconnection of the casing from the base.

ALFRED L. GRISÉ.